United States Patent [19]

Spaulding

[11] 4,004,097
[45] Jan. 18, 1977

[54] AUTOMATIC METER READING DEVICE

[75] Inventor: David M Spaulding, Marin County, Calif.

[73] Assignee: Badger Meter, Inc., Richmond, Calif.

[22] Filed: Jan. 3, 1975

[21] Appl. No.: 538,355

[52] U.S. Cl. .................. 179/2 A; 340/188 R; 340/150

[51] Int. Cl.² .................. H04M 11/00

[58] Field of Search ......... 179/2 A, 2 DP; 340/151, 340/150, 146.1 BA

[56] References Cited

UNITED STATES PATENTS

| | | | |
|---|---|---|---|
| 3,142,726 | 7/1964 | Brothman | 179/2 A |
| 3,400,378 | 9/1968 | Smith | 179/2 A |
| 3,553,376 | 1/1971 | Bogaart | 179/2 A |
| 3,609,691 | 9/1971 | Stewart | 340/151 |
| 3,742,142 | 6/1973 | Martin | 179/2 A |
| 3,743,938 | 7/1973 | Davis | 179/15 BF |
| 3,772,649 | 11/1973 | Haselwood | 340/146.1 BA |
| 3,796,993 | 3/1974 | Fox | 340/151 |
| 3,800,091 | 3/1974 | Glidden | 179/2 A |
| 3,842,206 | 10/1974 | Barsilloti | 179/2 A |
| 3,914,757 | 10/1975 | Finlay | 340/151 |
| 3,937,889 | 2/1976 | Bell | 179/2 DP |

*Primary Examiner*—Kathleen H. Claffy
*Assistant Examiner*—E. Matt Kemeny
*Attorney, Agent, or Firm*—Lothrop & West

[57] ABSTRACT

A device for automatically reading one or more meters at a remote location and supplying the information read over telephone lines to a central station includes a coupler effective on command from the central station to furnish power to the meter reading device from the telephone lines and to energize the device to duplicate the readings of the meter counters in sequence to respective registers, from which the readings are encoded in an encoder effective to transmit the information through the coupler and over the telephone lines to a central station by frequency-shift modulation, and to repeat the message until signalled by the central station to stop.

18 Claims, 5 Drawing Figures

FIG_1A

FIG_1B

FIG_2

FIG_3A

FIG._3B

AUTOMATIC METER READING DEVICE

It is desirable to provide a way of assembling at a central location such as a telephone office or a computer station information derived from a number of meters or registers disposed at places remote from the central location or station and to do so over telephone lines and without requiring traveling meter readers to visit the meter locations.

It is an object of the invention to provide a meter reading device that can readily be used with meters already in existence with little or no modifications and can be used with existing telephone lines with only acceptable modifications and can be used with computers that are presently readily available.

Another object of the invention is to provide a meter reading device that does not substantially interfere with the customary meter operation nor the customary use of the telephone lines.

A further object of the invention is to provide a meter reading device that is accurate in ascertaining and transmitting meter data.

An additional object of the invention is to provide a consistent, reliable and economical device for furnishing at a central point, data developed at a number of remote meters or comparable devices.

Other objects, together with the foregoing, are attained in the form of the invention described in the accompanying description and shown in the accompanying drawings, in which.

Figure 1A:
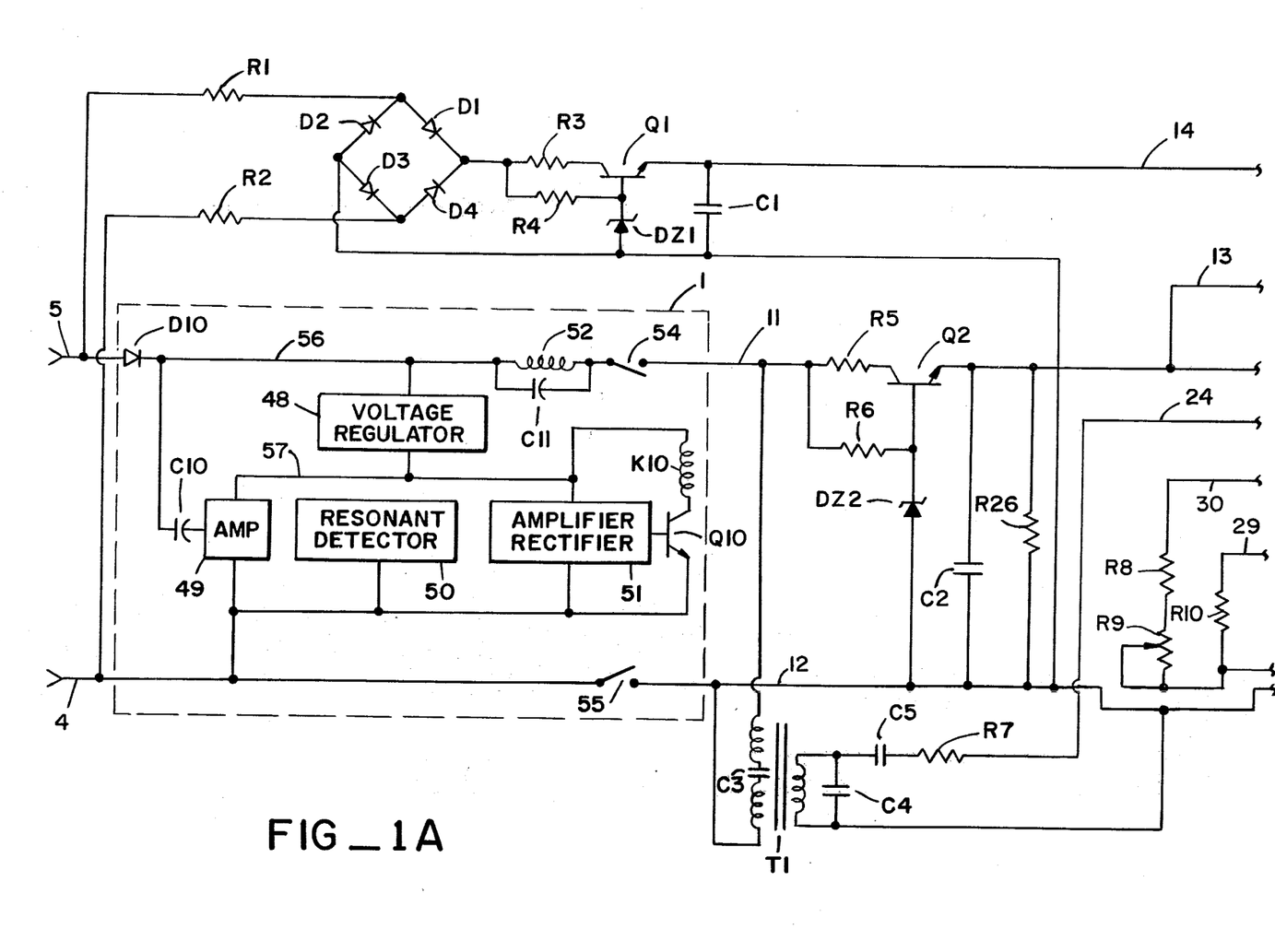
FIG. 1A is a portion of a diagram of a circuit forming part of the meter reading device.
Figure 1B:
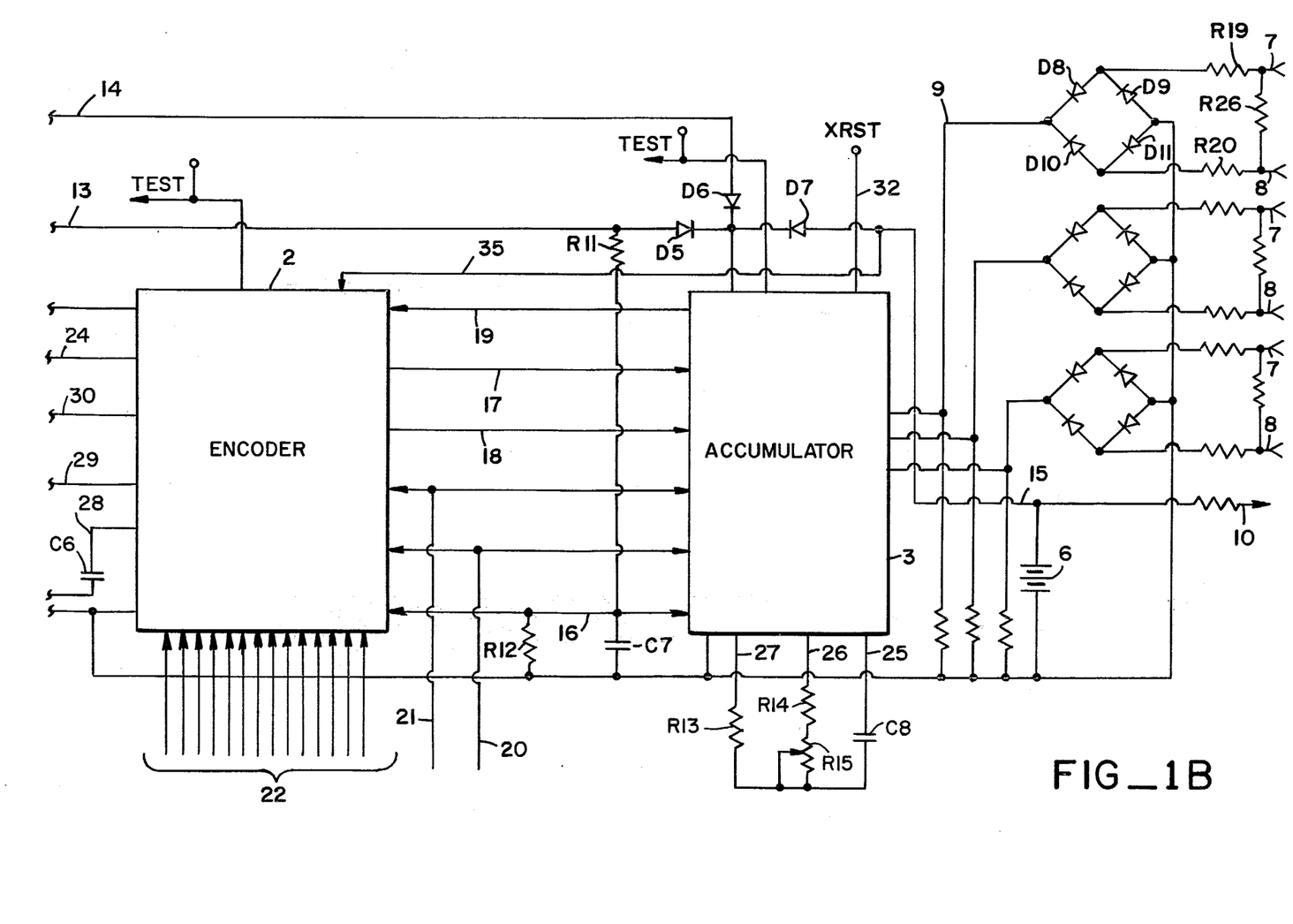
FIG. 1B is another portion of a diagram of the circuit forming part of the meter reading device, FIG. 1B continuing the showing in FIG. 1A when placed on the right-hand side of FIG. 1A.

At the subscriber end the mechanism is as shown particularly in FIGS. 1A and 1B. The connection to the telephone central office is by conductors 4 and 5 provided primarily with a coupler 1, an encoder 2 and an accumulator 3 and supporting equipment. Each of these is described below.

The device operates in either of two modes, a quiescent mode during which only the accumulator 3 is active to accept and accumulate meter usage information, and a readout mode during which all the circuitry is active to transmit the accumulated meter usage information over the conductors 4 and 5 to the central office.

In the quiescent mode, no power is applied to the encoder 2, but power is applied to the accumulator 3 in either of two ways. In one way, the normal DC power is supplied from the telephone conductors 4 and 5 through a network comprised of R1, R2, D1, D2, D3, D4, R3, R4, Q1, DZ1 and C1, acting to rectify and regulate the supply through a lead 14 connected through a diode D6 to the accumulator 3. In the other way, in the absence of power on the telephone conductors 4 and 5, a standby battery 6 supplies power through a lead 15 and a diode D7. Should the power supply be from the battery only or from some other source than the telephone lines 4 and 5, then the network R1 . . . C1 can be omitted.

The accumulator 3 accepts meter usage inputs from three meters for separate accumulation. There may be two forms of meter usage signals. The first form is an electrical pulse appropriately generated to correspond to a reading unit and applied to a pair of terminals 7 and 8 for each of the three meters (if all present) and loaded and attenuated by an associated network comprising R19, R20 and R26. Since the polarity of the pulse may not be known, a diode bridge D8, D9, D10 and D11 is used to assure that the polarity on a lead 9 to the accumulator 3 is known. The input circuits from the second and third meters are identical but are not separately referenced, for clarity.

The second form of meter usage input signal to the accumulator 3 results from a momentary contact closure of a duration about the same as that of a pulse. For example, a momentary contact representing a reading unit can be made between a battery supply lead 10 and the input lead 7. This contact produces a pulse-like signal in the lead 9.

During quiescent mode the coupler 1 completely isolates the telephone lines 4 and 5 from the coupler output leads 11 and 12, but during the readout mode a suitable interrogating signal (discussed below) is sent from the central office over the lines 4 and 5 and is received and decoded by the coupler 1 and then makes a connection between the lines 4 and 11 and the leads 5 and 12, supplying DC power to the leads 11 and 12 and creating a path to the central office for AC signals.

The DC power on the leads 11 and 12 energizes a regulating circuit R5, R6, Q2, DZ2, C2 and R26 and appears as DC power of suitable voltage on the lead 13. This voltage on the lead 13 is sufficiently greater than the voltage on either the lead 14 or the lead 15 so that, during readout mode, power is supplied to the accumulator 3 via the lead 13 and the diode D5 rather than by the lead 14 and the diodes D6 or by the lead 15 and the diode D7. This ensures that the signals between the encoder 2 and the accumulator 3 are electrically compatible. Also, if the network R1 . . . C1 is not used, power from the lead 13 and the diode D5 keeps the battery 6 charged and powers both the accumulator 3 and the encoder 2.

Additionally, when voltage is so applied to the lead 13 a signal $\overline{POR}$ (power on reset) is generated on a line 16 through a conductor including a resistor R11 and by means of R12 and C7 and is applied both to the encoder 2 and the accumulator 3 and resets both of them to an initial condition so both function properly during readout. As the readout progresses, two signals are generated by the encoder 2 and are applied to the accumulator 3. These signals are designated "accumulator clock" on a line 17 connecting the encoder and the accumulator and "accumulator select clock" on a line 18 connecting the encoder and the accumulator. The combination of these signals together with the $\overline{POR}$ signal on the line 16 causes the accumulator 3 to read out serially the meter usage information on an accumulator data lead 19 and so into the encoder 2.

Should there be less than three meters to read, the encoder 2 and the accumulator 3 are programmed for the number of meters actually present. For one meter, leads 20 and 21 are connected to the lead 13. For two meters, the lead 20 is connected to the lead 13 and the lead 21 is left open or unconnected. For three meters, both the leads 20 and 21 are left open or unconnected.

Each installation is given a suitable identification number of three characters programmed into the encoder initially via a bundle 22 of 14 leads. This affords any one of 16384 ($2^{14}$) numbers for the installation and is read out as part of the message transmitted to the central office for use in checking the source of the transmission.

The battery status if also furnished the encoder for transmission to the central office through a conductor 35 joined to the lead 15.

On the leads 17 and 18 the encoder delivers timing signals to the accumulator data on the lead 19. It receives an identification number on the leads 22, the number of active meters on the lead bundle 22, the battery status on the leads 15 and 35 generates a message including synchronizing characters, parity and longitudinal redundancy checks (LRC). The message contains meter usage, identification and status information and is translated by the encoder 2 into a self-clocking Manchester code that is modulated by frequency shift onto a tone carrier. This is applied by a lead 24 to a coupling network of R7, C5, C4, T1 and C3. This connects the tone signal in balanced fashion to the leads 11 and 12 and so through the coupler 1 to the telephone lines 4 and 5.

The transmitted message preferably comprises two consecutive records for each meter present, a maximum of six records per message. Each record itself comprises 12 characters of six bits each. The record is as follows:

character 1 - mark (herein, a character all bits of which are 1's)
$B_1 = 1 =$ the least significant bit
$B_2 = 1$
$B_3 = 1$
$B_4 = 1$
$B_5 = 1$
$B_6 = 1$
character 2 - synchronizing character
$B_1 = 1$
$B_2 = 0$
$B_3 = 1$
$B_4 = 0$
$B_5 = 1$
$B_6 = 1$
character 3 - synchronizing character
- same as character 2
character 4 - synchronizing character
- same as character 2
character 5 - least significant part of identification number
$B_1 = 1$
$B_2 = ID_1$
$B_3 = ID_2$
$B_4 = ID_3$
$B_5 = ID_4$
$B_6 =$ odd parity (the number of 1's in the character is odd)
character 6 - middle part of identification number
$B_1 = ID_5$
$B_2 = ID_6$
$B_3 = ID_7$
$B_4 = ID_8$
$B_5 = ID_9$
$B_6 =$ odd parity
character 7 - most significant part of identification number
$B_1 = ID_{10}$
$B_2 = ID_{11}$
$B_3 = ID_{12}$
$B_4 = ID_{13}$
$B_5 = ID_{14}$
$B_6 =$ odd parity
character 8 - most significant meter usage character
$B_1 = ACC_{15} = 0$
$B_2 = ACC_{14}$
$B_3 = ACC_{13}$
$B_4 = ACC_{12}$
$B_5 = ACC_{11}$
$B_6 =$ odd parity
character 9 - middle meter usage character
$B_1 = ACC_{10}$
$B_2 = ACC_9$
$B_3 = ACC_8$
$B_4 = ACC_7$
$B_5 = ACC_6$
$B_6 =$ odd parity
character 10 - least significant meter usage character
$B_1 = ACC_5$
$B_2 = ACC_4$
$B_3 = ACC_3$
$B_4 = ACC_2$
$B_5 = ACC_1$
$B_6 =$ odd parity
character 11 - status
$\left. \begin{array}{l} B_1 = \\ B_2 = \end{array} \right\}$ code indicating which meter this record applies to
$B_3 =$ state of the battery 6
$B_4 = 1$
$B_5 = 1$
$B_6 =$ odd parity
character 12 - LRC
$\left. \begin{array}{l} B_1 \\ B_2 \\ B_3 \\ B_4 \\ B_5 \\ B_6 \end{array} \right\}$ Computed or chosen to form longitudinal parity for entire record, not including mark or synchronizing characters. Parity is even.

Each message can consist of up to and inclusive of six records, as follows:
Record 1 = Meter No. 1
Record 2 = Meter No. 2 (second reading)
Record 3 = Meter No. 2 (if present)
Record 4 = Meter No. 2 (second reading)
Record 5 = Meter No. 3 (if present)
Record 6 = Meter No. 3 (second reading)

The message is terminated by the central office momentarily removing the DC power from the lines 4 and 5. This causes the coupler switches to open and the equipment returns to its quiescent mode. If the DC power is not removed at the end of the message, there is message repetition from the beginning until the DC power is turned off.

Reverting to the accumulator 3 as illustrated in FIG. 1B, there are leads 25, 26 and 27 (see also FIG. 2) connecting components R13, R14, R15 and C8 to an oscillator 36 in the accumulator, as appears below. For test purposes only, each meter usage counter is reset to zero when a signal XRST on lead 32 and the accumulator meter input on line 9 are true.

Figure 2:
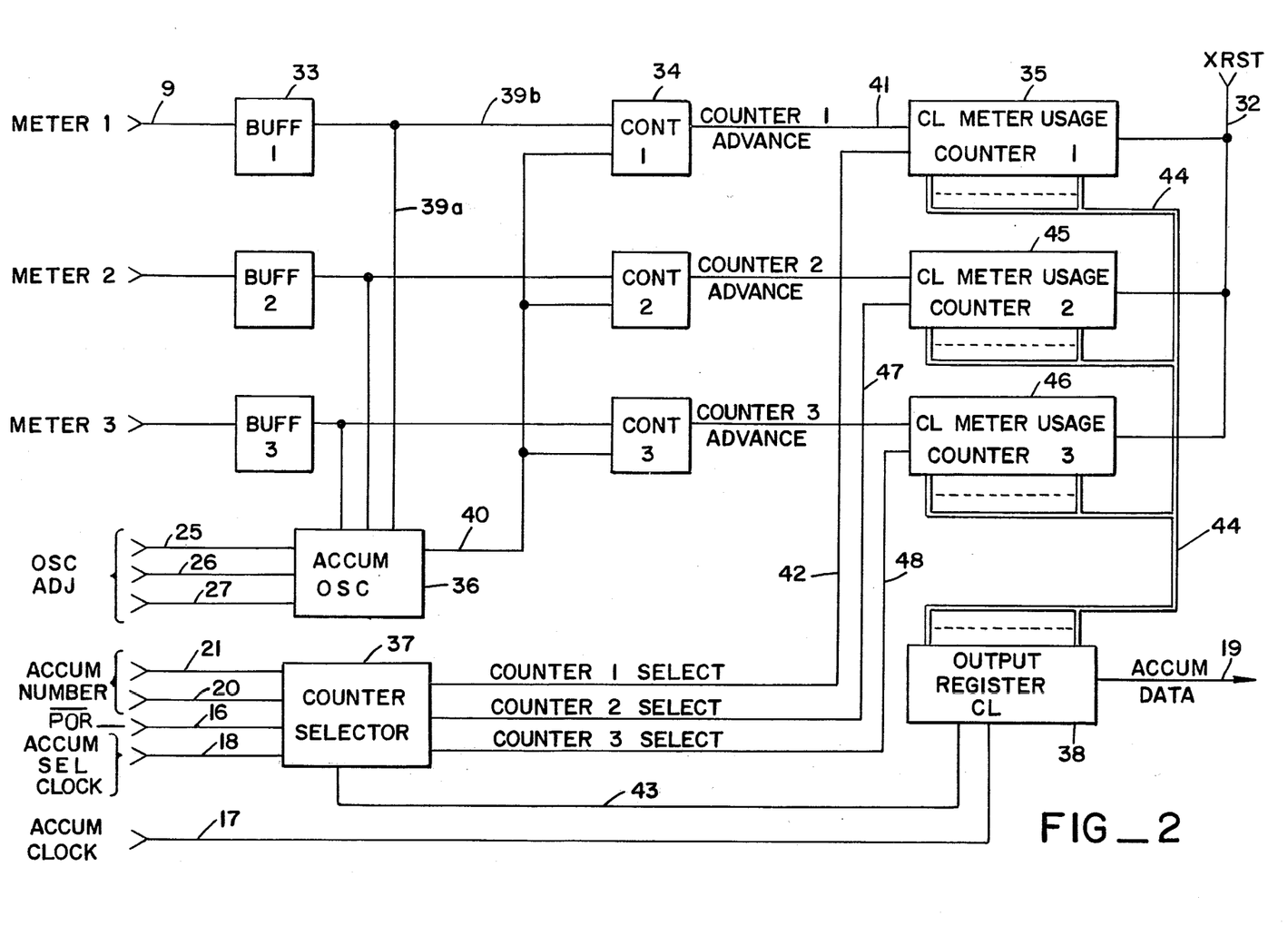
FIG. 2 is a diagram of a circuit having to do primarily with an accumulator arrangement forming part of the meter reading device.

The makeup of the accumulator 3 is shown in more detail in FIG. 2. There are three identical sets of circuits, one for each meter, the description of one applying equally to the others.

In the quiescent mode (and, if desired, also in the readout mode) pulses arriving from the first meter through the lead 9, for example, go through an inverting and amplifying buffer 33 and from there through a lead 39a to an accumulator oscillator 36 and through a joined lead 39b to a control 34. The pulse signal in the lead 39a starts the accumulator oscillator 36 to function to apply pulses of approximately 10 ms to an output lead 40 which persist as long as the input signal exists on the lead 39a. The oscillator pulses on the lead 40 are carried thereby to the control 34 along with the original pulse arriving on the lead 39b. The function of the control 34 is to ensure that one and only one counter advance signal is applied to the counter 35 of the first meter whenever a legitimate input pulse appears on the lead 9, and that spurious or short duration pulses (noise) do not cause the counter to advance.

The control 34 functions as follows: the first oscillator pulse appearing on the lead 40 after the initial application of the pulse on the lead 39b causes a flip-flop in the control 34 to toggle. This opens a gate allowing the second oscillator pulse to pass through and provide a signal on a lead 41 to an increment counter 35 provided that the original pulse on the lead 39b is still present. If the input signal on the lead 9 is too short, the flip-flop will reset prior to the reception of the second pulse from the oscillator 36 and no signal will appear on the lead 41. If a signal does appear on the lead 41 to advance the counter 35, the control 34 operates by a suitable flip-flop and gates to ensure that no further advance pulses will appear on the lead 41 until the original input signal on the lead 9 has disappeared and a new cycle has been started by a new signal on the lead 9.

The counter 35 is a conventional fourteen-stage binary counter provided with logical feedback which causes the counter to be reset to zero when the counter contains the binary equivalent of $9999_{10}$ and a new advance signal is received. Thus the counter operates modulo 10,000. The count can thus stay in phase with the ususal mechanical register associated with the meter which normally counts in decimal fashion. Each meter counter 35 (45, 46) thus advances one count for each legitimate usage pulse applied thereto.

As noted above, the readout mode is initiated by the impression of DC voltage across the leads 4 and 5 and so across the leads 12 and 13 and the appearance of a signal $\overline{POR}$ on the lead 16 (FIG. 1B) and at the counter selector 37 (FIG. 2). Internal circuitry therein is thus affected to cause the readout always to start with the first counter 35. The signal $\overline{POR}$ on the lead 16 is processed in the counter selector 37 with the result appearing on the lead 42 and also on the lead 43 extending to an output register 38. The combination of signals in the leads 42 and 43 causes the contents of the counter 35 to be duplicated in the output register 38. This is done by transferring the contents of the counter 35 to the output register 38 in parallel along a bundle 44 of fourteen transfer lines (FIG. 2). Despite the transfer, the original contents remain in the counter 35 but are duplicated in the output register 38. At a predetermined time after the transfer takes place, clock signals appear on the accumulator clock lead 17. These clock signals appear in three groups, each group having five pulses and each group being separated by a gap of one clock period. The gap allows the insertion by the encoder 2 of a parity bit after each 5 meter usage counter data bits, as noted above.

The clock signals on the lead 17 are applied to the output register 38 and cause the register contents to appear in serial fashion on the accumulator data lead 19 for transfer to the encoder 2. This results in transferring the fourteen bits originally in the counter 35 to the encoder 2, along with a fifteenth "dummy"bit, which is always 0, for use in the message to the central office. After this transfer has been effected, a signal appears on the accumulator select clock lead 18 and is applied to the counter selector 37 and advances a modulo six counter therein. This counter provides control over which of the meter usage counters 35, 45 and 46 is selected for transfer to the encoder 2. The first two counts of the modulo six counter are devoted to the first counter 35, the next two counts are devoted to the second counter 45, and the last two counts are devoted to the third counter 46, as follows:

|     | After this signal: $\overline{POR}$ |      |       | Usage counter selected: 1 |
| --- | --- | --- | --- | --- |
| 1st | accum. | sel. | clock | 1 |
| 2nd | "      | "    | "     | 2 |
| 3rd | "      | "    | "     | 2 |
| 4th | "      | "    | "     | 3 |
| 5th | "      | "    | "     | 3 |

The accumulator select clock signal on the lead 18 also causes a signal to appear on the lead 43, again causing the output register 38 to be loaded. Since the first counter 35 is still selected, the contents of the first counter are duplicated or reproduced in the output register 38, as before. Again, at an appropriate time, clock signals appear on the accumulator clock lead 17, causing the serial transfer of the contents of the output register 38 to the encoder 2 on the lead 19. Thus, for the second time the contents of the first counter 35 have been transferred from counter register and from the output register to the encoder 2.

Now, another signal appears on the accumulator select clock lead 18, again causing the modulo six counter to advance, this time to a state corresponding to the selection of the second counter 45. At this time the signal disappears from the first counter 35 select lead 42 and a signal appears on the second counter 45 select lead 47. The transfer process is repeated and the contents of the second counter 45 are twice transferred to the output register 38 and then to the encoder 2. Subsequent signals cause the selection of the third counter 46 by the lead 48 and its contents are twice transferred to the encoder in the fashion previously described. If the process is permitted to continue at this time, the modulo six counter returns to its first state, again selecting the first counter 35, and the process is repeated until terminated by the removal of DC power from the lead 13.

If there are only one meter or only two meters to be read, there are suitable gates put into the leads 20 and 21 of the counter selector 37 to foreshorten the counting cycle of the modulo six counter therein to provide selection of only the first counter 35 or only the first counter 35 and the second counter 45.

In the quiescent mode, the encoder 2 is totally inactive but in the readout mode, power is supplied to the lead 13 and this, in turn, causes the $\overline{POR}$ signal to appear on the lead 16. This $\overline{POR}$ signal is routed (see FIG. 3A, conductors omitted for clarity) to all of a group of counters 58, 59 and 60 (see FIG. 3B) and counters 61, 62 and 63 as well as to a timing logic unit 64, resetting all flip-flops in these units to the initial state.

Figure 3A:
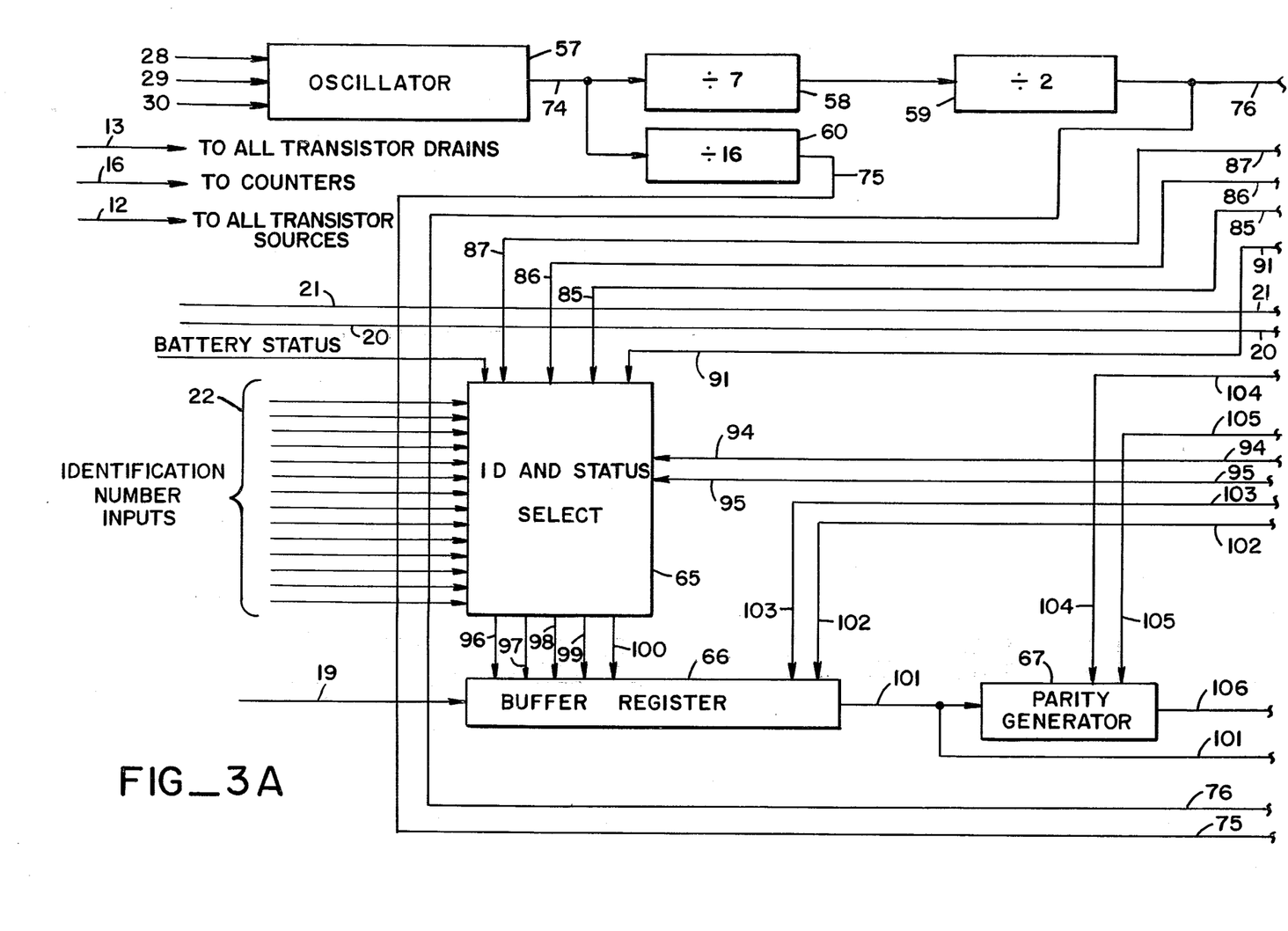
FIG. 3A is a portion of a diagram primarily concerned with an encoder arrangement forming part of the meter reading device.

The application of DC power to the lead 13 energizes an oscillator 57 to apply a signal (for example, 33.6 KHz) to a lead 74 divided by various counter chains described below to provide clock and logic signals as follows:

| Frequency |     | Use          | Division |
| --- | --- | --- | --- |
| 33.6 | KHz | Basic        | 1   |
| 2.4  | KHz | FSK mark     | 14  |
| 2.1  | KHz | FSK space    | 16  |
| 300. | Hz  | Timing logic | 112 |

-continued

| Frequency | Use | Division |
| --- | --- | --- |
| 150. Hz | Bit clock | 224 |
| 25. Hz | Character clock | 1344 |
| 2.083 Hz | Accum. select clock | 16128 |

Resistors R8, R9 and R10 and capacitor C6 are connected by leads 30, 29 and 28, respectively, to the encoder 2 and serve as frequency determining elements of an oscillator in the encoder.

The listed frequencies are developed in the following way. The basic 33.6 KHz signal on the lead 74 is applied to a divide-by-sixteen counter 60 to produce 2.1 KHz on a lead 75. The lead 74 also furnishes the basic signal to a divide-by-seven counter 58 in cascade with a divide-by-two counter 59 producing one fourteenth the frequency or 2.4 KHz on a lead 76. This signal on the lead 76 is further processed (FIG. 3B) by a dual output counter 61 which divides by eight to produce 300. Hz on a lead 77 and also divides by 16 to produce 150. Hz on a lead 78. The 150. Hz signal on the lead 78 is again divided by six in a bit counter 62 to provide a 25. Hz character clock on a lead 79. The bit counter 62 also produces signals on leads 80 and 81 extending to a timing logic unit 64 (see below) to identify which bit is which. The character clock (25. Hz) on the lead 79 is processed by a divide-by-twelve character counter 63. This, in turn, produces signals (2.083 Hz) on 12 leads 82 through 93, each of which is used to identify a particular character in each record, as noted in FIG. 3B, and provides the basic timing for the accumulator select clock on the lead 18.

Figure 3B:
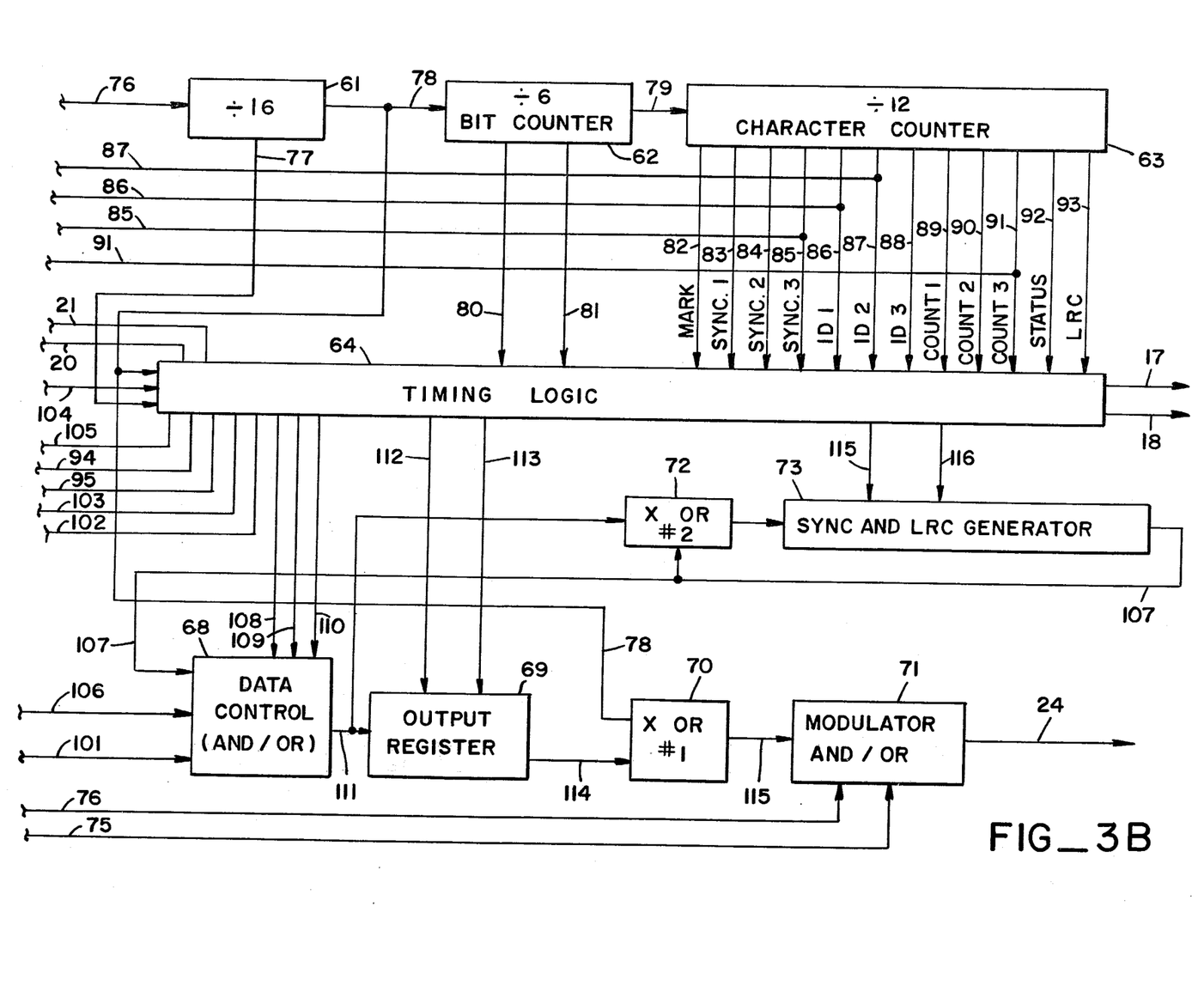
FIG. 3B is another portion of the diagram primarily concerned with the encoder arrangement, FIG. 3B continuing the showing in FIG. 3A when placed on the right-hand side of FIG. 3A.

Other elements in the encoder 2 are the timing logic unit 64 which includes a counter programmed by accumulator select leads 20 and 21 and which keeps track of which meter usage information is currently being transmitted. The output of this counter is applied to leads 94 and 95, which signals are used, as described later, to determine the proper coding of bits 1 and 2 ($B_1$ and $B_2$) of character 11 (status) of each record transmitted. The timing logic unit 64 also contains two flip-flops which, under control of the signal $\overline{POR}$, the lead 16, and of the character counter 63, cause six characters of mark data to be applied to the telephone line, 4, 5, after the coupler 3 makes connection to the line and prior to the beginning of the first record. These six mark characters appear only once at the beginning of transmission and are for the purpose of allowing the settling of any transients appearing on the telephone line as a result of the coupler 3 connecting the meter reading equipment hereto. The remainder of the timing logic unit 64 includes gating elements used to generate various timing signals to be described later.

The ID and status select unit 65 includes gating elements and, under control of signals from the character counter 63 and the timing logic unit 64, provides appropriate 5-bit characters comprising the ID and status portions of the records to the buffer register 66 on five leads 96 through 100 at the appropriate times.

The buffer register 66 is a five-stage serial and parallel input, serial output shift register. Parallel inputs are on the leads 96 through 100 and a serial input of accumulator data is on the lead 19 (see FIGS. 1B and 3A). Serial output is on a lead 101. The loading of the buffer register 66 is controlled by a signal on the lead 102 from the timing logic unit 64 and the shifting of the buffer register 66 is caused by a clock signal on the lead 103 also from the timing logic unit 64.

The parity generator 67 inlcudes a flip-flop and suitable gating elements. Its function is to determine bit 6 ($B_6$) of each character transmitted (except mark, sync. and LRC characters) so that the parity of each character is odd. The parity generator 67 receives its clock signal from the timing logic unit 64 over the lead 104 and is cleared for the next character by a parity clear signal from the timing logic unit 64 over the lead 105. The parity generator 67 produces an output on a lead 106 sampled by a data control unit 68 (FIG. 3B) including three gates, one to select as output either sync./LRC information on a lead 107, another to select parity information on a lead 106 and the third to select data on the lead 101. The data control 68 is controlled by leads 108, 109 and 110 from the timing logic unit 64 and which respectively cause selection of data, parity or sync./LRC information. The information selected is applied to an output lead 111 having one branch going to an output register 69.

The register 69 includes a gate and a flip-flop controlled by the gate. Its function is to accept information provided by the data control 68 on lead 111 or alternatively to accept Mark Set information on the lead 112 during mark character transmission. A clock signal is provided to the flip-flop on the head 113 from the timing logic unit 64. The output of the output register 69 is applied to and is available from a lead 114 extending to an exclusive or No. 1 unit 70. The purpose of the unit 70 is to convert the data on the lead 114 which is in Non-Return-to-Zero format to self-clocking coded data (Manchester code). This is accomplished by exclusive-oring the data on the lead 114 with the signal (150 Hz) on the head 78 from the divider 61. The output is a resulting signal in Manchester code that is applied to the lead 115.

The signal in the lead 115 is supplied to an and/or, FSK modulator 71 which causes the coded data on the lead 115 to be frequency-shift modulated onto 2.4 KHz or 2.1 KHz signals respectively supplied on leads 76 and 75. The resultant FSK signal is supplied to the lead 24 for transmission to the central office.

Also from the data control output lead 11 a signal goes to a sync. and LRC generator 73 including six flip-flops and attendant gating. The generator 73 performs two functions. During the transmission of the three sync. characters in each record, it generates each sync. character under control of a sync. strobe signal on a lead 115 from the timing logic unit 64. Each character so controlled is shifted out on a lead 107 under control of a sync. and LRC clock signal received on a lead 116 from the unit 64. During the body of the message (excluding mark and sync. characters) the generator 73 operates, as is known, with an exclusive or No. 2 unit 72 to form the longitudinal redundancy character (LRC) transmitted at the end of each record.

The devices, as described, and their adjuncts operate when power is applied to the lead 13 causing the signal $\overline{POR}$ on the lead 16 and the counters and flip-flops to be set to their proper initial state. The oscillator 57 (FIG. 3A) is energized producing the various clock and timing signals previously described. For the first six counts of the character counter 63 (FIG. 3B), the timing logic unit 64 forces the output register 69 to the mark state, producing six characters of mark on the telephone line to allow it to settle.

After these first six characters of mark, the character counter 63 arrives at a state which energizes the lead 82 corresponding to the first character of the actual record (also a mark). This signal is effective upon the timing logic unit 64 and causes subsequent counts of the character counter 63 to produce the various characters of the record. After the first character of the record has been transmitted, the character counter 63 advances and selects the lead 83. This removes the mark set signal from the lead 112 and produces a signal on the sync. strobe lead 115 in turn causing a sync. character to be formed in the sync. and LRC generator 73. At this time a signal appears on the LRC and sync. select lead 110 causing the data control 68 to select lead 107 as an input. Suitable clock signals are applied to the lead 113 and the lead 116 and so shift the six bits of the sync. character out of the sync. and LRC generator 73 through the data control 68 and the output register 69 and then via the X-OR No. 1 coder 70 and the modulator 71 to the FSK data lead 24. After the six bits of the first sync. character have been so processed, the character counter 63 advances to the select lead 84 and the just-mentioned steps are repeated for the second sync. character. The character counter 63 advances again to the select lead 85 and the third sync. character is similarly processed. At this time the parity generator 67 is reset by a signal on the parity clear lead 105 to condition it to generate parity for the character about to be transmitted. The signal on the select lead 85 is also applied to the ID and status select unit 65. This in turn causes the first four ID bits ($ID_1$ through $ID_4$) to be placed on the four leads 96 through 99 and a 1 to be placed on the lead 100, in accordance with the record construction described above. At the time of transmission of the sixth and last bit of the third sync. character, a buffer load signal appears on the lead 102 causing the information on the leads 96 through 100 to be loaded in parallel into the buffer register 66.

The character counter 63 now advances to the select lead 86 defining the first character of the ID number. A signal is also provided on the lead 108 to cause the data control 68 to select the lead 101 for input. Now, the five bits of the data in the buffer register 66 are shifted out on the line 101 under control of the buffer clock 103 into the output register 69 under control of the data clock 113. The shift is thence into the exclusive or No. 1 70 and through the modulator 71 for delivery to the telephone line. During this process, the parity generator 67 monitors the information on the lead 101 under control of the parity clock 104 and prepares the appropriate parity bit for insertion as the sixth bit of the character. After the five bits have been shifted from the buffer register 66, the signal on the lead 108 is removed and a signal is applied to the parity select lead 109. This causes the data control 68 to select the lead 106 as the input. The appropriate value of the parity bit is at this time on the lead 106, is so transferred to the output register 69 in the sixth bit ($B_6$) position and appears on the lead 24 following the first five bits for transmission on the telephone line.

Now the character counter 63 advances to select the lead 87 causing the second portion of the ID number (bits $ID_5$ through $ID_9$) to be transmitted in the same fashion. The next advance of the character counter 63 selects the lead 88 and causes the remaining portion of the ID number (bits $ID_{10}$ through $ID_{14}$ to be transmitted.

During the shifting of the third ID character (bits $ID_{10}$ through $ID_{14}$) out of the buffer register 66, a clock signal is applied to the accumulator clock lead 17 (FIG. 1B) causing the accumulator 3 to present the first five bits of meter usage information serially on the lead 19. As the third ID character is shifted out of the buffer register 66, the first meter usage character is shifted in. Thus at the time of advance of the character counter 63 to the select lead 89, the first usage character is already resting in the buffer register 66.

Now the first meter usage character is processed for transmission on the lead 24 in the same manner as the previous ID characters. While the first meter usage character is being shifted out of the buffer register 66, the accumulator clock is applied to the lead 17 causing the second five bits of the meter usage information to be shifted into the buffer register 66. Thus, when the first meter usage character has been processed and transmitted, the second meter usage character is occupying the buffer register 66. The character counter 63 now advances to the select lead 90 and the process is repeated with the third meter usage character being shifted into the buffer register 66 as the second meter usage character is being transmitted.

The character counter 63 then advances to the select lead 91 and the third meter usage character is then further advanced and transmitted. During this period no clock signals are applied to the lead 17 so that at the end of this interval the buffer register 66 is clear and ready to accept the next (status) character from the ID and status select unit 65. The signal on the lead 91 causes the ID and status select unit 65 to present the status character to the buffer register 66 on the leads 96 through 100. Bits 1 and 2 ($B_1$ and $B_2$) of the status character are encoded to represent which meter usage record is currently being transmitted. This information is derived by the ID and status select unit 65 from the leads 94 and 95 which carry signals from the timing logic unit 64 indicating which meter is being read. The signals on the leads 94 and 95 are supplied by a modulo six counter in the timing logic unit 64 which keeps step with the modulo six counter in the counter selector 37 portion of the accumulator 3. This modulo six counter, like the counter selector 37, foreshortens its counting cycle appropriately if less than three meters are being read, this action being under control of the accumulator select signals on the leads 20 and 21.

Bit 3 ($B_3$) of the status character indicates the charge condition of the standby battery 6. A circuit in the ID and status select unit 65 monitors the voltage on the lead 15 and causes either a 1 (good battery) or a 0 (bad battery) to be inserted in the buffer register 66.

Bits 4 and 5 ($B_4$ and $B_5$) of the status character are not significant and are transmitted as 1 S.

At the time of transmission of the parity bit for the third meter usage character, a signal is applied to the buffer load lead 102 causing the status character to be loaded into the buffer register 66. The character counter 63 now advances to the select lead 92 and the status character is transmitted in a manner similar to the preceding characters.

During the interval of transmission of the three ID characters, the three meter usage characters and the status character, the sync. and LRC generator 73 together with the exclusive or No. 2 72 has been monitoring the data flow via the lead 111 and has been generating the appropriate LRC character. After the transmission of the status character, the character counter 63 advances to the select lead 93. This action causes the signal to be removed from the lead 108 and applied instead to the LRC and sync. select lead 110. The data control 68 is thus caused to select the lead 107 as an input. The sync. and LRC generator 73, under control of the sync. and LRC clock 116, provides its contents serially on the lead 107 and this information is processed and transmitted on the lead 24. This completes one record.

The foregoing process is repeated for each succeeding record, including the second transmission of meter No. 1 usage, the two transmissions of meter No. 2 usage and the two transmissions of meter No. 3 usage. If any meter is omitted, the corresponding transmission is also omitted.

The original six characters of mark, for line settling are not repeated. Each new record starts with the sequence, mark character, sync., sync., sync., etc. and occurs indefinitely until the coupler 1 disconnects the meter reading equipment from the line.

The coupler 1 referred to above is not part of this invention but is described in more detail for better understanding of this disclosure.

The telephone line is joined to the leads 4 and 5 (FIG. 1A). During quiescent mode, the polarity on the telephone line is always such that the lead 5 is negative with respect to the lead 4. Under these conditions, the diode D10 serves to disconnect the coupler 1 from the lines 4 and 5 and no voltage appears on the lead 56. When the meter reading process is to be started, the central office reverses the polarity on the lines 4 and 5 and renders the lead 5 positive with respect to the lead 4. The diode D10 now conducts and there is then voltage across the leads 56 and 4. This activates the voltage regulator 48 to apply a suitably lower voltage to the lead 57, in turn activating the coupler circuitry.

The lines 4, 5 may be party lines, and only one of several subscribers thereon may be selected for interrogation. Only one of several meter reading assemblies should be activated. To do this, a system of tone signalling is employed in addition to the described DC polarity reversal. Each coupler is assigned a particular tone frequency from a set (arbitrarily 12), and any coupler will respond only if its alloted tone appears on the lines 4 and 5 when their polarity is reversed.

After the polarity reversal, a single frequency alerting tone is supplied by the central office and is applied to the coupler 1. The tone frequency is applied to an amplifier 49 by a capacitor C10. After amplification the tone is applied to a resonant detector 50, which responds only to the particular tone frequency for the installation.

An alerting tone matching the frequency of the resonant detector 50 produces an output signal applied to an amplifier-rectifier 51 producing a DC output which causes a transistor Q10 to conduct and so operating a relay K10. This relay has two coils 52 and 53 and two sets of contacts 54 and 55. The relay K10 is initially operated by the coil 53. This causes the contacts 54 and 55 to close and to connect the meter reading leads 11 and 12 to the telephone lines 4 and 5. The meter reading equipment draws enough current from the telephone lines 4 and 5 to cause the coil 52 to keep the relay K10 operated and the contacts 54 and 55 closed. The alerting tone may then be removed so that it does not interfere with the meter reading message. The coupler maintains the connection between the telephone lines 4 and 5 and the leads 11 and 12 until the reversed polarity is removed from the telephone lines 4 and 5. The diode D10 then disconnects the lead 56, the current through the coil 52 ceases and the relay K10 drops out, disconnecting the leads 11 and 12 from the lines 4 and 5. The meter reading message is transmitted by the encoder 2 in the period between the removal of the alerting tone and the removal of the reversed DC voltage from the lines 4 and 5. The capacitor C11 is provided in parallel with the coil 52 to provide a low impedance path for the message from the encoder 2.

What is claimed is:

1. An apparatus used for reading a number of meters and for transmitting meter data to a remote receiver, the improvement comprising:
   means for repeating transmission of said data to said receiver, said repeating means being responsive to a condition of said receiver to terminate said transmission,
   said repeating means comprising a modulo-n counter, n being an integer corresponding to the number of meters being read.

2. A device as recited in claim 1 further comprising transmitting means, wherein said data, is transmitted by said transmitting means to a receiving means responsive to a first condition of said transmitting means caused by said receiving means.

3. Device recited in claim 2 wherein repeated transmission of data is terminated responsive to a second condition of said transmitting means caused by said receiving means.

4. An automatic remote meter reading device for transmitting meter data to a remote receiver comprising:
   a coupling means for connection to a telephone line, said coupling means being responsive to a voltage reversal on said telephone line caused by said receiver and to an identification code transmitted on said telephone line,
   a power supply means for said meter reading device connected to said telephone line for providing power to said meter reading device responsive to said voltage reversal,
   means for generating a power signal for initiating operation of said meter reading device responsive to said coupling means, said power signal persisting as long as said voltage reversal persists,
   accumulator means for receiving signals from each meter to be read, said accumulator means comprising:
   a buffer means for each meter, each such buffer receiving signals from only one meter and conditioned thereby,
   an oscillating means responsive to said buffer means for generating periodic pulses,
   a counter corresponding to each buffer,
   a control means for each buffer, said control means being readied by said condition of said buffer and by a first pulse of said oscillator and being triggered by a second pulse of said oscillator, for causing said corresponding counter to count only when said condition of said buffer persists for a time at least as long as the period between said periodic pulses,
   counter selecting means responsive to said power signal and to an accumulator select clock signal for providing signals enabling a transfer of a count in a particular counter to an output register, said counter selecting means comprising a modulo-$n$ counter advanced by said accumulator select clock signal, $n$ being a number corresponding to the number of meters being read by said meter reading device, advances of said modulo-$n$ counter causing contents of different counters to be transferred to said output register, said counter selecting means being programmable to enable operation with a variable number of meters, and encoding means for generating timing signals including said acummulator select clock signals for use by said accumulator means and for causing said meter data in said output register to be transmitted to said remote receiver, whereby said modulo-$n$ counter within said counter selecting means causes repeated transfers of the contents of the different counters to said output register as long as said power signal persists.

5. An automatic remote meter reading device for transmitting meter data to a remote receiver as recited in claim 4 wherein said encoding means comprises:

an oscillator for providing a sequence of pulses at one frequency, a plurality of dividing means for providing pulse sequences of frequencies differing from said one frequency, counting means for generating signals representative of specific characters in a signal representing said meter data, timing logic means responsive to said counters for generating said accumulator select clock signal and for generating an accumulator clock signal for transferring the contents of said output register to a buffer register, identification means for providing an identification code for transmission with said contents of said buffer register, said timing logic means further providing signals for transferring said buffer register's contents to a modulating means and signals for generating parity check bits and characters, whereby said remote receiver initiates transmission of meter reading data by producing a voltage reversal on said telephone line, and whereby said modulo-$n$ counter causes said data to represent sequentially the readings of the various meters being read, and whereby said modulo-$n$ counter and said power signal cause said data to be transmitted repeatedly as long as said remote receiver maintains said voltage reversal on said telephone line.

6. An automatic remote meter reading device for transmitting meter data to a remote receiver as recited in claim 5 wherein $n$ equals a multiple $k$ of the number of meters being read by said apparatus, whereby each meter reading is transmitted $k$ times before the next subsequent meter is read, the sequence of $n$ readings continuing as long as said remote receiver maintains said voltage reversal on said telephone line.

7. An automatic meter reading device for a meter effective to furnish pulses to a receiving means according to the meter reading comprising a mechanism adjacent one or more meters and including an accumulator having one counter for each meter and advanced thereby, a register, means in said accumulator for duplicating the reading of each of said counters in said register, an encoder, means controlled by said encoder for encoding the reading of said register in sequence into a self-clocking binary code message, means for repeatedly transmitting said code message, and means responsive to said receiving means for terminating transmission of said code message.

8. A device as in claim 7 including a telephone line, and a coupler for connecting said transmitting means to said telephone line.

9. A device as in claim 8 including means in said coupler for energizing said encoder by a reversal of polarity of said telephone line and for deenergizing said encoder by discontinuing said polarity reversal.

10. A device as in claim 7 in which said encoder includes means for generating a message including synchronizing characters, parity and longitudinal redundancy checks, and meter usage and identification information.

11. A device as in claim 7 in which said coupler supplies power to said encoder and said accumulator from said telephone line.

12. A device as in claim 11 including a source of standby power and in which said encoder includes means for transmitting the status of said standby power source as part of said message.

13. A device as in claim 7 including means in said accumulator for selecting the first in order of a plurality of said meters to furnish the first meter readout in said message.

14. A device as in claim 7 including means for sampling a meter output signal to verify that a signal on a meter input line is of proper voltage and duration.

15. A device as in claim 7 in which said terminating means includes a coupler to said telephone line.

16. A device as in claim 15 including means in said coupler responsive to a voltage reversal on said telephone line to activate said encoder.

17. A device as in claim 16, including means in said coupler responsive to a tone signal on said telephone line to activate said encoder.

18. A device as in claim 16, including means in said coupler for supplying power from said telephone line to said encoder.

* * * * *